United States Patent

Kozulla

[11] 3,965,570
[45] June 29, 1976

[54] HOSE SKIVING TOOL
[75] Inventor: Robert E. Kozulla, Willowick, Ohio
[73] Assignee: The Weatherhead Company, Cleveland, Ohio
[22] Filed: Apr. 21, 1975
[21] Appl. No.: 569,979

[52] U.S. Cl. .............................. 30/90.1; 30/90.6; 81/9.5 R; 82/4 R
[51] Int. Cl.² .................. B21F 13/00; B26B 27/00
[58] Field of Search .............. 30/90.1, 90.6, 90.7, 30/90.2, 90.3; 81/9.5 R, 9.5 C; 82/4

[56] References Cited
UNITED STATES PATENTS

| | | | |
|---|---|---|---|
| 3,240,088 | 3/1966 | Samuels et al. | 82/4 |
| 3,354,762 | 11/1967 | Wolff | 81/9.5 X |
| 3,398,610 | 8/1968 | Matthews | 81/9.5 C |
| 3,433,106 | 3/1969 | Matthews | 81/9.5 R |

*Primary Examiner*—Al Lawrence Smith
*Assistant Examiner*—J. T. Zatarga
*Attorney, Agent, or Firm*—McNenny, Fearne, Gordon, Gail, Dickinson & Schiller

[57] ABSTRACT

A skiving tool is disclosed for removing a layer of hose or the like to prepare the hose for receipt of a fitting. The tool includes a mandrel which is proportioned to project into the end of a hose to laterally support the hose with respect to the tool while permitting relative rotation between the tool and the hose. The tool includes an adjustable tool post which supports a disc cutter and a chisel-type cutter which cooperate to cut away a layer of the hose as the tool is rotated around the axis of the hose. The adjustment of the cutting depth of the two cutters is accomplished by rotating the tool post with respect to a support arm. A torsion spring is connected between the support arm and tool post to bias the tool posts in one direction and to maintain engagement between the end of an adjusting screw and the surface on the tool post. Adjustment is obtained by loosening a lock nut to allow adjusting rotation of the tool post and then adjusting the screw in or out to the desired position. The spring maintains the contact with the surface and the screw so that a single adjustment of a single screw completes the adjusting operation. After the adjustment is completed, the nut is tightened to lock the tool in its adjusted position.

9 Claims, 5 Drawing Figures

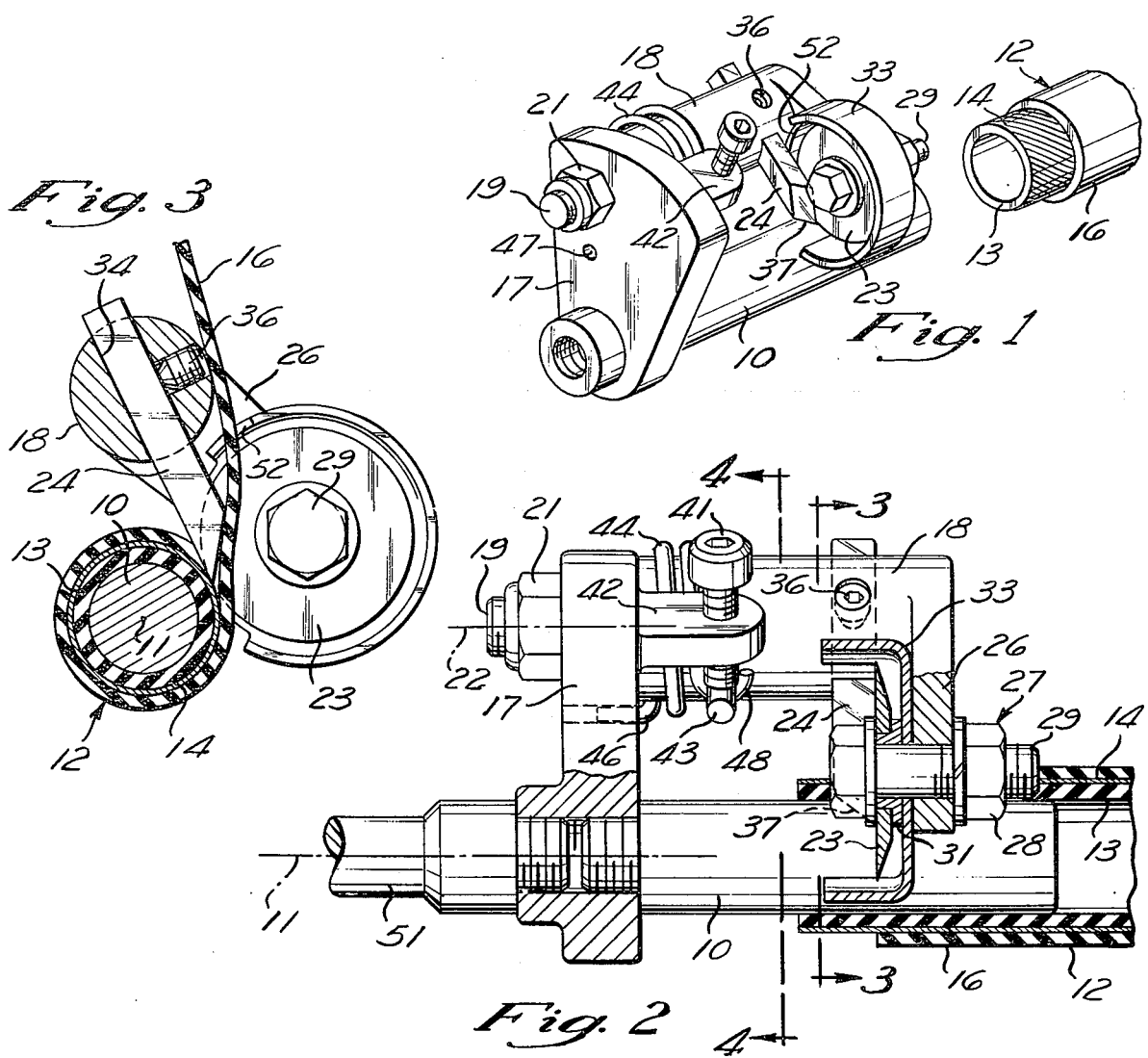
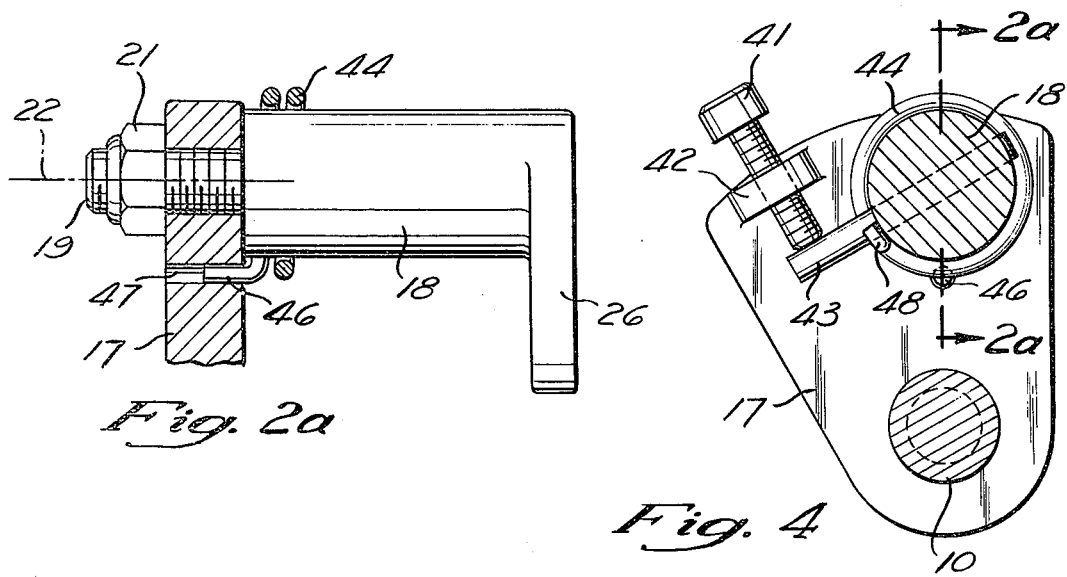

HOSE SKIVING TOOL

BACKGROUND OF THE INVENTION

This invention relates generally to skiving tools for stripping the outer cover from hose or the like, and more particularly to such a tool which provides novel and improved means to adjust the depth of cut and a novel and improved cutter arrangement.

PRIOR ART

Tools for skiving hose or the like are known. Examples of such tools are illustrated in the U.S. Letters Pat. to: Modes et al., No. 3,082,523 dated Mar. 26, 1973; Matthews U.S. Pat. No. 3,204,495 dated Sept. 7, 1965; Stallings U.S. Pat. No. 3,215,007 dated Nov. 2, 1965; Wolff U.S. Pat. No. 3,354,762 dated Nov. 2, 1967; Horrocks U.S. Pat. No. 3,620,104 dated Nov. 16, 1971; Bull U.S. Pat. No. 3,686,982 dated Aug. 29, 1972; and Matthews U.S. Pat. No. 3,820,420 dated June 28, 1974.

The Wolff U.S. Pat. No. 3,354,762 discloses a skiving tool having a mandrel which fits into and laterally locates the cutter with respect to the hose end. Such patent provides a tool post which supports a cutter and which is adjustable to allow radial adjustment of the cutter with respect to the mandrel and in turn, with respect to the hose end on the mandrel. The structure for such adjustment provided in such patent, utilizes two opposed adjusting screws, which must be separately manipulated during the adjustment of the tool.

SUMMARY OF THE INVENTION

In accordance with a preferred embodiment of this invention, a skiving tool is provided with an improved adjusting mechanism which is simple, easy to use, and which provides accurate adjustment of the tool. Such adjustment includes a support arm member, and a tool post member movable relative to each other to provide adjustment of the depth of cut produced by cutters carried by the tool post member. A screw is threaded into one of the members and engages a surface on the other member. A spring connected between the members biases the surface and the screw toward each other and maintains contact therebetween while the screw is adjusted. After adjustment, separate locking means operate to lock the two members in the adjusted position. With this improved structure, adjustment of cutting depth is accurately achieved by simply turning a single screw.

The preferred embodiment also provides two separate cutters, one of which is a disc cutter, positioned in a plane perpendicular to the axis of the mandrel and operable to make a radial cut through the hose to a predetermined depth determined by the adjustment described above. A separate cutter has a cutting edge extending generally longitudinally relative to a hose supported by the mandrel. The second cutter cooperates with the disc cutter to cleanly cut away a layer of hose material to a location at the radial cut formed by the disc. The second cutter is mounted for adjustment relative to the tool post member so it can be properly positioned with respect to the disc cutter.

BRIEF DESCRIPTION OF THE DRAWINGS

FIG. 1 is a perspective view of a preferred cutter structure in accordance with the present invention, illustrating the tool and a partially skived hose in spaced relationship, FIG. 2 is a side elevation, partially in longitudinal section, illustrating the assembled skiving tool of FIG. 1 in an intermediate position of skiving a hose, FIG. 2a is a fragmentary section taken generally along 2a—2a of FIG. 4, illustrating the mounting of the tool post on the tool support arm, FIG. 3 is a section taken generally along 3—3 of FIG. 2, illustrating the cooperative operation of the two cutters in the skiving operation, and FIG. 4 is a section taken generally along 4—4 of FIG. 2, illustrating the structural detail of the tool adjusting mechanism.

DETAILED DESCRIPTION OF THE DRAWINGS

The illlustrated embodiment incorporating the present invention includes a cylindrical mandrel 10 having an axis 11. The mandrel 10 is proportioned to closely fit into the end of a piece of hose 12, which is to be skived to laterally position the tool and hose with respect to each other with the hose axis coaxial with the mandrel axis 11. In the drawings the hose 12 is illustrated as partially skived and in FIG. 1, the hose is illustrated spaced from the tool for purposes of illustration. Typically, the hose 12 is provided with an inner elastomeric wall portion 13, a wire braid or the like 14, and an outer wall portion 16, also formed of elastomeric material or the like. In the skiving operation the outer layer 16 is cut away from the hose for a predetermined distance from the end thereof to leave the braid 14 exposed. Such skiving operations are usually performed to prepare the end of the hose to receive known types of hose fittings.

The end of the mandrel 10 is threaded into a support arm member 17, as best illustrated in FIG. 2. The support arm member 17 extends laterally with respect to the axis 11, to provide a mounting section for a tool post member 18. The tool post member 18 is provided with a threaded shank 19, (as best illustrated in FIG. 2a) which extends through the support member 17 and receives a nut 21. When the nut 21 is loosened, the tool post member 18 is rotatable for adjustment, about the axis 22 of the shank 19. The axis 22 is laterally spaced from the axis 11 by this structure and in the illustrated embodiment the two axes are parallel.

Mounted on the tool post member 18 are cooperating cutters 23 and 24. The cutter 23 is a disc cutter journaled on a lateral projection 26 by a pivot assembly 27. The pivot assembly 27 includes a nut 28, a bolt 29 and a spacer 31, which removably supports the cutting disc 23 and also provides the structure for mounting a cup shaped cutter guard 33. The cutter 23 is positioned to rotate in a plane perpendicular to the axis 11.

The second cutter 24 is of a chisel type and extends through a passage 34 in the tool post member 18 and is locked in its adjusted by a set screw 36. The cutter 24 provides a cutting edge 37 which is positioned immediately adjacent to the innermost periphery of the disc cutter 23, and is preferably located at its forward edge, substantially tangent to the outer surface of the braid 14. Although the cutting edge 37 is preferably formed with rake, it extends in a direction generally parallel to the axis 11 and generally longitudinally with respect to a hose on the mandrel 10. A simple adjusting mechanism is provided to adjust the position of the cutters with respect to the mandrel, and in turn, with respect to a hose positioned around a mandrel. Such adjusting mechanism operates by turning the tool post 18 in a controlled manner with respect to the support member 17 about the axis 22. The adjusting mechanism includes an adjusting screw 41 threaded through an axial projection 42 formed on the support member 17. The end of the screw engages the surface of a pin 43 mounted on the tool post 18 and extending laterally therefrom. A torque spring 44 loops around the cylindrical portion of the tool post 18, as best illustrated in FIG. 4, and is provided with a first end 46 which projects into an opening 47 in the support member 17, as illustrated in FIG. 2a. The other end 48 is formed with a hook which extends around the pin 43, as best illustrated in FIGS. 2 and 4.

The spring 44 is stressed so that it produces a spring bias tending to rotate the tool post 18 in a clockwise direction (as illustrated in FIG. 4) to maintain the surface of the pin 43 in engagement with the inner end of the screw 41. During use of the tool, it is preferably to tighten the nut 21 to lock the tool post in its adjusted position.

When adjustment of the tool is required for any reason, the nut 21 is loosened and the screw 41 is threaded either in toward the mandrel 10 or is threaded out away from the mandrel. Since the line-of-action of the screw is spaced from the axis 22, movement of the screw causes rotation of the tool post 18 about the axis 22.

When the cutters must be adjusted inward, the screw 41 is threaded inwardly, causing the tool post 18 to rotate in an anti-clockwise direction (as illustrated in FIG. 4) with respect to the support member 17. The adjust the cutters away from the mandrel, the screw 41 is threaded back away from the mandrel allowing the tool post 18 to rotate with respect to the support 17 in a clockwise direction. The spring 44 supplies the torque to the tool post 18 to produce such clockwise rotation by maintaining the surface of the pin 43 in engagement with the end of the screw 41. When the tool post is adjusted to the desired position, the nut 21 is preferably tightened to lock the tool post 18 against rotation with respect to the support 17. With the preferred structure illustrated, precise positioning and adjustment of the tool post 18, with respect to the support 17, is obtained by merely threading a single screw, either in or out, to produce the desired movement and positioning of the tool post 18.

In operation of the skiving tool, it is usual to clamp the hose in a support (not illustrated) and to position the mandrel in the hose end to locate the tool and its cutters with respect to the end of the hose 12. The mandrel 10 is proportioned so that it is sufficiently long to project into the hose at a substantial distance before the cutters engage the end of the hose, so that proper orientation and stability of the tool is obtained before cutting operation actually commences. The actual skiving operation is accomplished by rotating the tool by means of a crank 51 or the like, which is threaded into the support 17 while pressing the tool in a direction along the axis 11 toward the tube. As the tool is pressed forward and rotated, the cutter 23 forms a substantially radial cut through the outer layer 16 to the braid 14, when the tool is properly adjusted. At the same time, the cutter 24 forms a cut in the longitudinal direction of the tube and separates the outer layer 16 immediately adjacent to the braid. Rotation of the tool with respect to the hose 12 continues until the hose 12 is skived for the desired distance from its end. Preferably, the tool support is sized so that when the desired length of skiving has been completed, the end of the tube engages the support 17 to prevent further axial movement of the tool assembly with respect to the hose. Preferably, the tool is then withdrawn while continuing to rotate the tool with respect to the hose, to cut away any possible irregularities which might have remained on the hose during the initial skiving operation, and to insure that a smooth skiving cut has been accomplished. In FIG. 3, the operation of the two cutters in skiving the hose is best illustrated. As the tool is rotated, with respect to the hose, the outer layer 16 is cut away from the main body of the tube and is deflected radially by the cutter 24 and out through a clearance opening 52 formed in the flange of the guard 33. Because the cutter 23 is mounted for rotation in the plane perpendicular to the axis 22, a clean edge is formed on the end of the layer 16 remaining on the hose when the skiving operation is completed.

Preferably the shank 19 and nut 21 are provided with a left-hand thread so that the torque applied to the tool post 18, when the nut is tightened to lock the tool in the adjusted position, is resisted by the screw and not the spring. With the illustrated structure, the loads on the cutters are also resisted by the screw and not the spring.

Although a preferred embodiment of this invention is illustrated, it should be understood that various modifications and rearrangements of parts may be resorted to without departing from the scope of the invention disclosed and claimed herein.

I claim:

1. A skiving tool for hose comprising cutter means, positioning means for laterally positioning a hose with respect to said cutter means for relative rotation between said hose and tool about a first axis, a support arm member connected to said positioning means, a tool post member mounted on said support arm member for adjustment rotation relative thereto about a second axis spaced from said first axis, said cutter means mounted on said tool post member operable upon relative rotation between said tool and hose about said first axis to engage such hose at a location spaced from said first axis and skive a layer therefrom, and adjusting means operable to adjustably move said tool post member relative to said support arm member about said second axis and to lock said members in adjusted positions; said adjusting means including a screw threaded into one of said members and engageable with a surface on the other of said members wherein both said screw and said surface are spaced from said second axis, and a spring connected between said members maintaining said screw and surface in engagement during adjustment, said cutter means including a disc cutter journalled on said tool post member and adapted to radially cut into a hose, and a separate chisel-type cutter having a cutting edge positioned adjacent to the inner extremity of said disc cutter, the cutting edge of said chisel-type cutter extending generally in a longitudinal direction with respect to a hose supported by said positioning means, said disc cutter being mounted in a phase perpendicular to said first axis.

2. A skiving tool as set forth in claim 1 wherein positioning means includes a cylindrical mandrel proportioned to fit into a hose with a close fit.

3. A skiving tool as set forth in claim 1 wherein said screw is threaded in said support arm member, and said surface is part of said tool post member.

4. A skiving tool as set forth in claim 3 wherein said tool post member includes a main body and said surface is provided by a pin projecting laterally from said main body.

5. A skiving tool as set forth in claim 4 wherein said spring is a torsion spring anchored at one end in said support arm member and providing a hook portion at its other end engaging said pin and urging such pin in a direction toward said screw.

6. A skiving tool as set forth in claim 5 wherein said adjusting means includes a nut threaded onto said tool post member which is tightened to lock the tool post member in the adjusted position, the tightening of said nut tending to apply a torque to said tool post member tending to urge said surface toward said screw.

7. A skiving tool as set forth in claim 5 wherein said main body member includes a generally cylindrical portion and said torsion spring loops around said cylindrical portion.

8. A skiving tool for skiving the outer layer of a hose wall comprising a mandrel constructed and arranged to be received within the hose wall with a sliding fit, a support arm rigidly secured to said mandrel and extending radially outward from said mandrel, a tool post extending axially from said support arm to a location spaced radially outward from said mandrel, said tool post carrying cutting tool means for skiving said outer layer, adjustable mounting means adjustably securing said tool post to said support arm for rotational movement of said tool post relative to said support arm for moving said cutting tool means toward and away from said mandrel to vary the depth of cut of said outer layer, said adjustable mounting means including axle means connecting said tool post to said support arm for rotational movement of said tool post about its longitudinal axis relative to said support arm, spring means biasing said tool post in one direction about its longitudinal axis, screw thread means constructed and arranged to rotate said tool post about its longitudinal axis against the bias of said spring means in a direction opposite to said first mentioned direction when said screw thread means is turned in one direction and to permit said spring means to rotate at said tool post in said one direction when said screw thread means is turned in the other direction, and locking means for locking said tool post against rotational movement relative to said support arm after said tool post is positioned by the operation of said spring means and said screw thread means, said locking means including a nut threaded onto said tool post member which is tightened to lock the tool post member in the adjusted position, the tightening of said nut tending to apply a force to said tool post member tending to urge said tool post member in said one direction.

9. A skiving tool as set forth in claim 8 wherein said nut is provided with a left-hand thread.

* * * * *

UNITED STATES PATENT AND TRADEMARK OFFICE
CERTIFICATE OF CORRECTION

PATENT NO. : 3,965,570
DATED : June 29, 1976
INVENTOR(S) : Robert Kozulla

It is certified that error appears in the above–identified patent and that said Letters Patent are hereby corrected as shown below:

Column 2, line 57, after "adjusted" insert --position--.

Column 3, line 19, "preferably" should read --preferable--.

Column 3, line 31, "The" should read --To--.

Column 3, line 47, after "In" insert --the--.

Column 4, line 61, "phase" should read --plane--.

Signed and Sealed this

Twenty-third Day of November 1976

[SEAL]

Attest:

RUTH C. MASON
*Attesting Officer*

C. MARSHALL DANN
*Commissioner of Patents and Trademarks*